(12) United States Patent
Meyer

(10) Patent No.: US 10,502,259 B2
(45) Date of Patent: Dec. 10, 2019

(54) BEARING ARRANGEMENT

(71) Applicant: Flender GmbH, Bocholt (DE)

(72) Inventor: Thomas Meyer, Stolberg (DE)

(73) Assignee: SIEMENS AKTIEGESELLSCHAFT, München (DE)

( * ) Notice: Subject to any disclaimer, the term of this patent is extended or adjusted under 35 U.S.C. 154(b) by 0 days.

(21) Appl. No.: 16/087,562

(22) PCT Filed: Mar. 21, 2017

(86) PCT No.: PCT/EP2017/056710
§ 371 (c)(1),
(2) Date: Sep. 21, 2018

(87) PCT Pub. No.: WO2017/162679
PCT Pub. Date: Sep. 28, 2017

(65) Prior Publication Data
US 2019/0107146 A1   Apr. 11, 2019

(30) Foreign Application Priority Data
Mar. 22, 2016   (EP) ..................................... 16161635

(51) Int. Cl.
| | |
|---|---|
| *F16C 17/10* | (2006.01) |
| *F16C 17/26* | (2006.01) |
| *F16C 25/02* | (2006.01) |
| *F16H 57/021* | (2012.01) |

(52) U.S. Cl.
CPC .............. *F16C 17/10* (2013.01); *F16C 17/26* (2013.01); *F16C 25/02* (2013.01); *F16C 2361/61* (2013.01); *F16H 57/021* (2013.01)

(58) Field of Classification Search
CPC ...... F16C 17/10; F16C 25/02; F16C 2361/61; F16H 57/021
See application file for complete search history.

(56) References Cited

U.S. PATENT DOCUMENTS

| | | | | |
|---|---|---|---|---|
| 3,476,451 | A | * 11/1969 | Schwartzman | ..... F16C 32/0622 384/110 |
| 3,762,240 | A | * 10/1973 | Adams | ................... B62D 3/123 384/272 |
| 3,777,590 | A | 12/1973 | Parkes | |

(Continued)

FOREIGN PATENT DOCUMENTS

| | | | |
|---|---|---|---|
| CH | 691191 A5 * | 5/2001 | ............. F16C 43/02 |
| DE | 2249248 A1 | 4/1973 | |

(Continued)

OTHER PUBLICATIONS

PCT International Search Report and Written Opinion of International Searching Authority dated Jun. 21, 2017 corresponding to PCT International Application No. PCT/EP2017/056710 filed Mar. 21, 2017.

*Primary Examiner* — Thomas R Hannon
(74) *Attorney, Agent, or Firm* — Henry M. Feiereisen LLC

(57) ABSTRACT

A bearing arrangement of a helical spur gear which is non-rotatably arranged on a transmission shaft includes two conical sliding bearings configured for support of the transmission shaft. Each of the sliding bearings defines a cone angle, with the cone angle of one of the sliding bearings being different than the cone angle of the other one of the sliding bearings.

17 Claims, 6 Drawing Sheets

(56) References Cited

U.S. PATENT DOCUMENTS

| | | | |
|---|---|---|---|
| 3,844,182 A | | 10/1974 | Bradshaw et al. |
| 3,861,764 A | * | 1/1975 | Adams .................. B62D 3/123 |
| | | | 384/125 |
| 4,369,668 A | | 1/1983 | Pollak-Banda et al. |
| 4,919,547 A | * | 4/1990 | Schwartzman ......... F16C 17/10 |
| | | | 384/100 |
| 6,463,822 B1 | | 10/2002 | Bader et al. |
| 8,591,371 B2 | | 11/2013 | Dinter et al. |
| 9,494,188 B2 | * | 11/2016 | Shellef .................... F16C 25/04 |
| 2003/0106384 A1 | * | 6/2003 | Yokota .................. F16C 19/386 |
| | | | 74/424 |
| 2012/0108380 A1 | | 5/2012 | Dinter et al. |
| 2016/0252426 A1 | | 9/2016 | Dinter et al. |
| 2019/0107146 A1 | | 4/2019 | Meyer |

FOREIGN PATENT DOCUMENTS

| | | |
|---|---|---|
| DE | 20013684 U1 | 11/2000 |
| DE | 102013204432 A1 | 10/2014 |
| EP | 0 021 223 A1 | 1/1981 |
| EP | 1 110 013 81 | 7/2001 |

\* cited by examiner

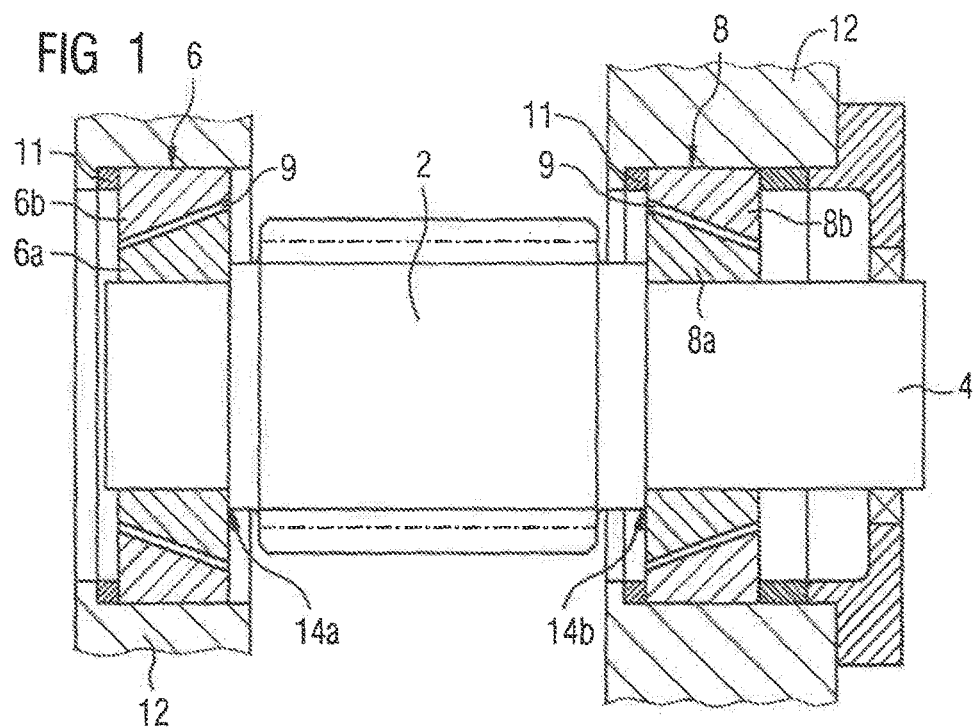
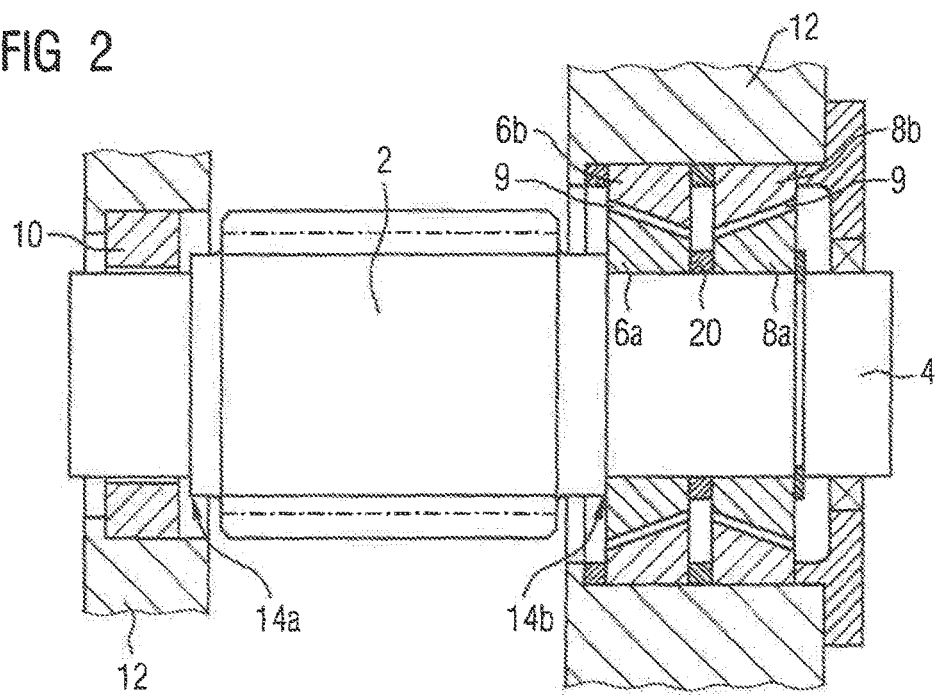

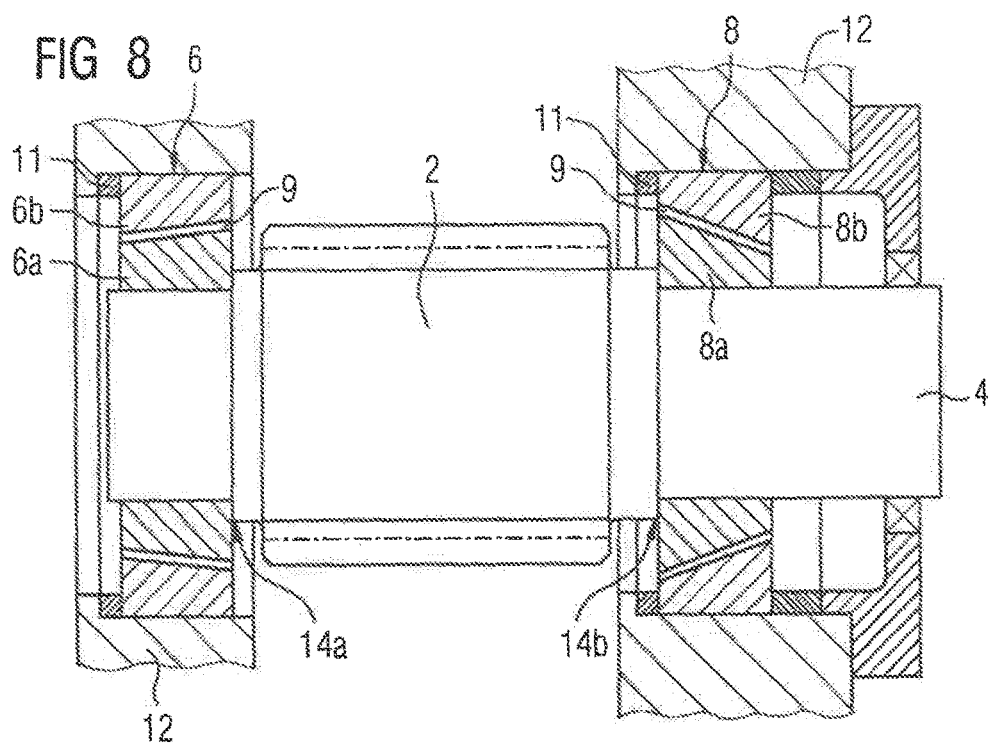
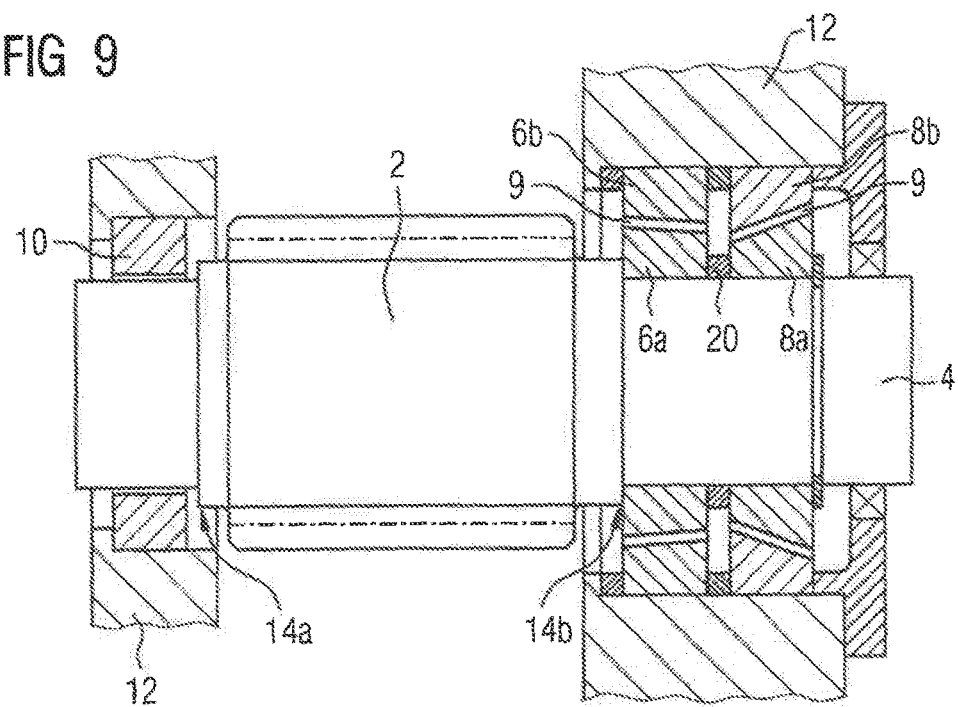

BEARING ARRANGEMENT

CROSS-REFERENCES TO RELATED APPLICATIONS

This application is the U.S. National Stage of International Application No. PCT/EP2017/056710, filed Mar. 21, 2017, which designated the United States and has been published as International Publication No. WO 2017/162679 and which claims the priority of European Patent Application, Serial No. 16161635.4, filed Mar. 22, 2016, pursuant to 35 U.S.C. 119(a)-(d).

The invention relates to a bearing arrangement of a helical spur gear.

It is known to provide gears with helical gearing in order to increase the loading capacity and smooth running. The helical gearing causes an axial force to act on the gear engaged with a second gear. With helical planetary wheels, which mesh with both a hollow wheel and a sun wheel, the axial forces resulting from the two opposing engagement operations are largely balanced out, so, overall, an axial force that is not excessively large acts on the planetary wheel. For this reason, axial guidance of the planetary wheel by way of guide disks, which can be produced with little expenditure, is sufficient here in many cases.

By contrast, a much stronger axial force acts in the case of helical spur gears which mesh with just one gear. If the herringbone gearing, which is expensive to produce, is discounted, this axial force that occurs with a spur gear has previously been absorbed by axial bearings and thrust collars combined with radial bearings, see for example EP 1 110 013 B1 (ZF Friedrichshafen AG) Jun. 27, 2001 and EP 0 021 223 B1 (Zahnräderfabrik Renk AG) Jan. 11, 1984. Devices of this kind require installation space in the immediate vicinity of the gear, however, whereby the constructional design is limited.

The object of the present invention is to create an improved bearing of a helical spur gear.

BACKGROUND OF THE INVENTION

Summary of the Invention

According to one aspect of the present invention, the object is achieved by a bearing arrangement of a helical spur gear which is non-rotatably arranged on a transmission shaft, wherein the transmission shaft is mounted in two conical sliding bearings, wherein the cone angles of the two conical sliding bearings are different.

According to another aspect of the present invention, the object is achieved by a transmission having a bearing arrangement as set forth above. The transmission is preferably an industrial or wind turbine gearbox.

According to yet another aspect of the present invention, the object is also achieved by a transmission having a bearing arrangement as set forth above.

The invention relates to a bearing arrangement of a helical spur gear. The spur gear is non-rotatably arranged on a transmission shaft. The spur gear can be arranged on the shaft by means of a non-positive, positive or substance-to-substance connection. It is also possible for the spur gear and the shaft to be formed in one piece. The embodiment of the connection of spur gear and shaft is not limited to said possibilities, however.

The transmission shaft is a shaft which supports the spur gear and is mounted so as to be rotatable about its longitudinal axis. Owing to the non-rotatable arrangement of the spur gear on the transmission shaft, a rotation of the spur gear inevitably causes a rotation of the transmission shaft. The transmission shaft is mounted in two conical sliding bearings. A conical sliding bearing is also called a cone sliding bearing. Further bearings, in particular conical sliding bearings, for mounting the transmission shaft can be present apart from the two conical sliding bearings. However, at least two conical sliding bearings are present for mounting the transmission shaft. A rotation of transmission shaft and spur gear relative to a fixed transmission housing is possible by way of the mounting of the transmission shaft. Conventional bearings for mounting a transmission shaft are roller bearings and sliding bearings.

According to the invention, at least two bearings of the transmission shaft are designed as conical sliding bearings. It is advantageous that the axial and radial forces, which act on the transmission shaft, are distributed among two sliding bearings. The load per bearing is therefore reduced. With a first direction of rotation of the helical spur gear, the transmission shaft is pushed in a first direction; with a second direction of rotation of the helical spur gear, reversed in relation to the first direction of rotation, for example in a reversing mode of the transmission, the transmission shaft is pushed in a second direction opposite to the first direction. In both directions of rotation of the spur gear, the axial force of the transmission shaft is therefore absorbed by a conical sliding bearing.

According to the invention, the cone angles of the two conical sliding bearings are different. The cone angle of one sliding bearing is the smaller of the two angles which is present between a tangent along the sliding face and the axis of rotational symmetry, in other words the longitudinal axis, of the sliding bearing sleeve of the sliding bearing. There are two boundary cases in which the cone angle is 0 degrees or 90 degrees. According to the invention, the difference between the cone angles of the two conical sliding bearings is greater than a manufacturing-related tolerance of the sliding bearing cone angle. In addition, the orientation of the conical sliding bearing is insignificant. In other words, the cone angle of a sliding bearing is always indicated with a positive value from the value range (0°; 90°).

The feature that the cone angles of the two conical sliding bearings are different has the advantage that different tilted positions of the shaft in the region of the two bearings can be corrected better than if the two conical sliding bearings have the same cone angle.

The invention is therefore based on the consideration of using conical sliding bearings which are capable of diverting axial as well as radial forces. The axial force acting on the gear pushes the transmission shaft in a particular direction as a function of the direction of rotation of the gear. A conical sliding bearing is preferably arranged such that the tapered end of the inner bearing sleeve points in the direction of the axial force. In this way the conical bearing sleeves are pushed inside each other such that the sliding bearing cannot migrate. The radial bearing clearance can be easily set by an axial adjustment of the conical outer bearing sleeve relative to the inner bearing sleeve. Furthermore, the adjustable bearing arrangement has a simple construction and is suitable for plug-in assembly. The invention dispenses with the use of large axial bearings and the axial installation space of the bearing arrangement is shortened.

The axial force that occurs with a spur gear is inventively easily absorbed by means of conical sliding faces of a sliding bearing.

The inventive bearing arrangement with sliding bearings has a lower weight and takes up less installation space compared to a bearing arrangement with rolling bearings.

Since the spur gear transfers a torque to the shaft, the spur gear is non-rotatably arranged on the transmission shaft and an arrangement of the at least one conical sliding bearing between the spur gear and the transmission shaft is still not possible. Instead, the conical sliding bearings are each arranged on the transmission shaft at end faces of the spur gear. In other words, the sliding bearings are located axially adjacent to and not radially under the gearing. This has the advantage that the conical sliding bearings, which, compared to a cylindrical sliding bearing, inevitably have an enlarged external diameter, do not lead to a disadvantageous enlargement of the diameter of the spur gear. A planetary wheel with a relatively small external diameter can therefore be implemented with the inventive bearing arrangement, in other words, the aim of a transmission with high power density and low weight is achieved.

It is not possible for a hydrodynamically supporting lubricant film to form in the region of a sliding bearing lubrication pocket because the lubrication pocket constitutes a geometric disruption to the convergent lubrication gap. With sliding bearings it is therefore conventional to arrange the lubrication pockets on that component of the sliding bearing for which point load results. In this case the lubrication pocket can be fixed in a position in the circumferential direction where it is located outside of the load region of the sliding bearing, in other words outside of the hydrodynamic lubrication gap, and does not cause any disruption to the sliding system. For this reason, the general aim is to avoid an arrangement of a lubrication pocket on a component on which a circumferential load acts.

Transferred to the present bearing arrangement, this means that the lubrication pockets are not arranged on a component of the sliding bearings that rotates with the shaft, but on a component that is at rest relative to the shaft. In this aspect the present invention differs from a sliding bearing arrangement of a planetary wheel bearing in which the lubrication pockets are arranged on the planetary shaft. The planetary wheel rotates about the shaft that is at rest relative thereto, for which reason a point load acts on the planetary axis and the lubrication pocket is positioned on the planetary shaft.

To prevent a rotation of the lubrication pocket into the load zone having the supporting lubrication gap, with the planetary wheel bearing, the shaft and all other components, which are mounted on the shaft, must be secured against rotation. In the inventive bearing arrangement on the other hand, point load results for the fixed housing part of the bearing in which the shaft is mounted. Consequently, it is not necessary to secure the bearing body that rotates with the shaft against rotation. However, it can be expedient to secure the bearing body that rotates with the shaft against rotation in order to prevent slippage between the shaft and the bearing body arranged on the shaft and the risk of fretting corrosion resulting therefrom. Securing the bearing body that rotates with the shaft against rotation, for example inner bearing sleeves, can be brought about for example in that oversized bearing sleeves are shrunk onto the transmission shaft following positioning of the sleeves.

Advantageous embodiments and developments of the invention are disclosed in the dependent claims.

According to a preferred embodiment of the invention, at least one of the conical sliding bearings comprises an inner and an outer bearing sleeve with a lubrication gap formed therebetween. The inner bearing sleeve is arranged on the transmission shaft and a surface of a cone-shaped sliding face is formed on the radially outer circumferential face of the inner bearing sleeve. The outer bearing sleeve is designed so as to correspond to the inner bearing sleeve, so a lubrication gap is formed between the two bearing sleeves. It is advantageous that the height of the lubrication gap can be set relative to the transmission housing by a change in the axial position of the outer bearing sleeve. In order to increase the support capacity of sliding bearings it is necessary to be able to set a precise, optimally small bearing clearance that is adapted to the application by taking into account all thermal expansions of the relevant components. The axial shaft displacements when reversing moments occur have to be kept low.

DETAILED DESCRIPTION OF PREFERRED EMBODIMENTS

According to a preferred embodiment of the invention, with at least one of the conical sliding bearings, the cone angle of the inner bearing sleeve and the cone angle of the outer bearing sleeve are different. The cone angle of a sliding bearing sleeve is the angle which exists between a tangent along the sliding face and the axis of rotational symmetry, in other words the longitudinal axis, of the sliding bearing sleeve. An incline of the transmission shaft relative to the transmission housing, which can occur under load, can be balanced out by the different cone angles of the two sleeves in order to prevent tilt supports in the bearing, similar to by way of a geometric correction in the sliding bearing. The different cone angles of the bearing sleeves are therefore used to balance out deformations and tilted positions of the transmission shaft.

According to a preferred embodiment of the invention, the bearing arrangement is designed as a slew bearing, in other words two sliding bearings arranged on the same end face of the spur gear are arranged in an O formation. Since a slew bearing constitutes a particularly stable shaft bearing with respect to tilted positions of the shaft, further bearings of the shaft can be omitted and therefore in particular a cantilevered support of the shaft can be achieved.

According to a preferred embodiment of the invention, the two conical sliding bearings are arranged side by side on the same side of the spur gear and the tapered ends of the two conical sliding bearings point toward each other. It is advantageous that the sliding bearings arranged in an O formation can absorb axial forces in both directions of the transmission shaft. A first of the two sliding bearings can therefore absorb the axial force during regular operation while the second of the two sliding bearings can absorb the axial force in reversing mode or braking load. Axial loads are therefore absorbed in both directions, but by just one bearing or bearing set in each case. Bearings in O formation produce a relatively rigid bearing which is particularly well suited to absorbing moment loads.

According to a preferred embodiment of the invention, the two conical bearings are arranged axially spaced apart. This axial spacing can preferably occur by way of a distance ring inserted between the tapered ends of the inner and/or outer bearing sleeves. It is advantageous that a minimum height of the lubrication gap is maintained. Lubricant can also be supplied to the lubrication gaps of the sliding bearings via the distance ring, for example with the aid of lubricant supply channels which extend in the interior of the transmission shaft. It is therefore possible to guide lubricant along the transmission shaft up to the distance ring and from there into the lubrication gaps.

According to a preferred embodiment of the invention, the two conical sliding bearings are arranged on both sides of the spur gear and the tapered ends of the two conical sliding bearings point away from each other. In other words, a first sliding bearing is arranged on a first end face of the spur gear and a second sliding bearing is arranged on the opposing end face of the spur gear. It is advantageous that the sliding bearings arranged in an X formation can absorb axial forces in both directions of the transmission shaft. Therefore, a first of the two sliding bearings can absorb the axial force during regular operation while the second of the two sliding bearings can absorb the axial force in reversing mode or braking loads. Axial loads are therefore absorbed in both directions, but by just one bearing or bearing set in each case.

According to a preferred embodiment of the invention, at least one conical sliding bearing has an adjusting device for adjusting the outer bearing sleeve in the axial direction in order to set the lubrication gap of the sliding bearing at a defined height. It is advantageous that a defined height of the lubrication gap can be set. An optimum height of the lubrication gap between the sliding faces of the corresponding bearing sleeves of the sliding bearing is a fundamental requirement for reliable operation of the bearing arrangement.

According to a preferred embodiment of the invention, exactly one sliding bearing can be adjusted and the outer bearing sleeves of the other sliding bearing have an axially fixed position. It is advantageous that a defined height adjustment of the lubrication gap can be made by adjustment at a sliding bearing.

According to a preferred embodiment of the invention, at least one of the conical sliding bearings has a lubricant supply in an element of the sliding bearing that is fixed in relation to the transmission shaft. The lubricant supply can comprise a lubricant supply channel through, in or along the transmission housing, and a lubrication pocket for distribution of lubricant in the sliding gap. The lubrication pocket is arranged in a component of the sliding bearing that surrounds the shaft and is fixed relative to the shaft, for example in an outer bearing sleeve. It is advantageous that the lubricant supply occurs through fixed components of the transmission and the lubrication pocket is arranged in a component of the sliding bearing loaded by a point load.

According to a preferred embodiment of the invention, the transmission has a bearing cover and/or a housing. The outer bearing sleeve is a component of the bearing cover or the housing of the transmission. In addition it is possible for at least one of the shaft bearing bodies and the shaft to be designed in one piece. In both cases it is advantageous for components of the transmission to be integrated and for securing against rotation to exist.

According to a preferred embodiment of the invention, the inner bearing sleeve is replaced by a conical shaft step. Here it is advantageous that the cone sleeve, in other words the inner bearing sleeve, on the shaft can be omitted, so the radial installation space is reduced.

BRIEF DESCRIPTION OF THE DRAWING

The invention will be illustrated below with reference to a plurality of exemplary embodiments and with the aid of the accompanying drawings. Schematically and not to scale in each case:

FIG. 1 shows an engaged sliding bearing in an X formation,

FIG. 2 shows a fixed-floating bearing with a double-cone sliding bearing and a cylindrical radial bearing, FIG. 8 shows an engaged sliding bearing in an X formation with clearly different cone angles, and FIG. 9 show a fixed-floating bearing with a double-cone sliding bearing with clearly different cone angles and a cylindrical radial bearing.

FIG. 1 shows a section of a transmission shaft 4 rotatably mounted in a transmission housing 12 and on which a helical spur gear 2 is non-rotatably and axially non-displaceably arranged. Immediately adjoining both end faces of the spur gear 2, the transmission shaft 4 has a shoulder 14a, 14b in each case, formed by a reduction in radius of the transmission shaft 4. Arranged non-rotatably on the transmission shaft 4 in the steps formed by the shoulders 14a, 14b on both sides of the spur gear 2 is in each case an inner, conically formed sliding bearing sleeve 6a, 8a. The securing against rotation of the inner bearing sleeves 6a, 8a is brought about in that the fit, produced with oversizing, of bearing sleeve and shaft is shrunk after positioning of the sleeve on the transmission shaft. The tapered ends of the conically formed inner bearing sleeves 6a, 8a point away from each other.

Figure 3:
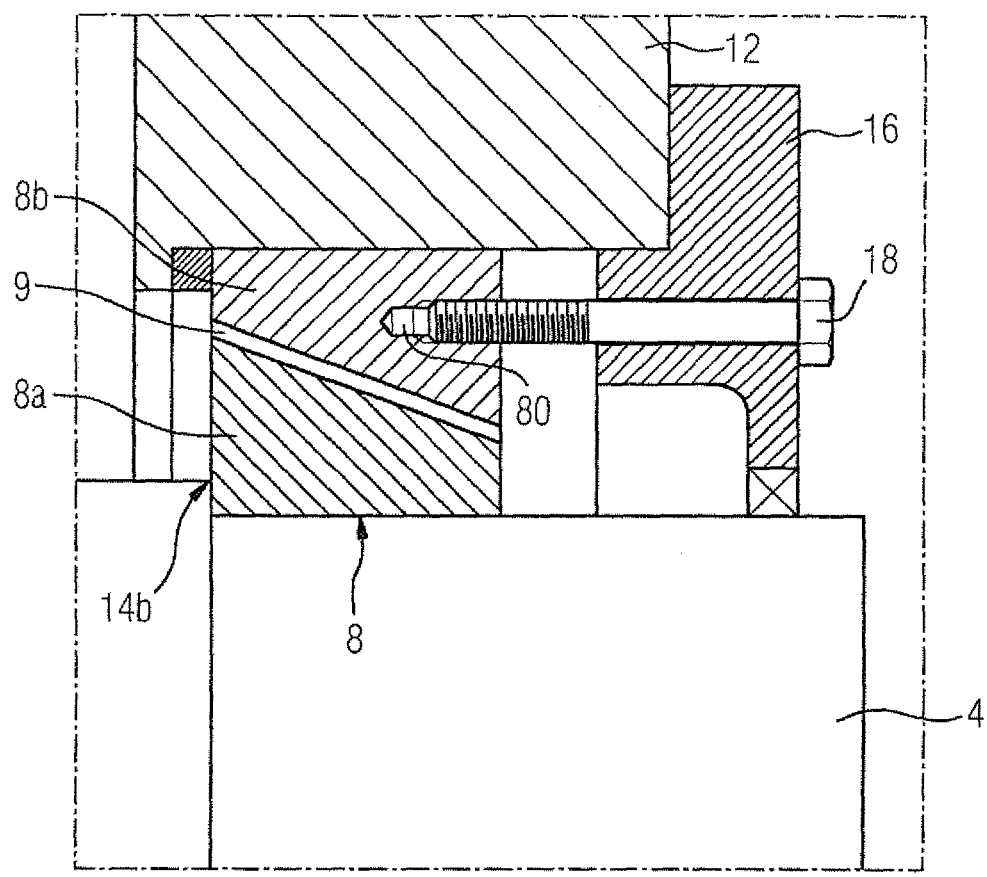
FIG. 3 shows an adjusting device.

In order to form sliding faces, the conically formed, radially outer circumferential faces of the inner bearing sleeves 6a, 8a are coated with a layer of a bearing metal for a sliding bearing, preferably made of a soft, relatively lightly wearing metal, such as, for example an alloy containing lead.

Outer bearing sleeves 6b, 8b are fixedly mounted in bearing seats, which are formed in the transmission housing 12, and are designed to correspond to the inner bearing sleeves 6a, 8a arranged on the transmission shaft 4. In each case an inner 6a, 8a and a corresponding outer bearing sleeve 6b, 8b with the lubrication gap 9 formed therebetween form a sliding bearing 6, 8. The transmission shaft 4 with the spur gear arranged thereon is mounted in two conical sliding bearings 6, 8 in an X formation in the arrangement shown in FIG. 1. With the two sliding bearings 6, 8, a distance ring 11 for setting the bearing clearance is inserted in each case axially between an end face of the outer bearing sleeves 6b, 8b and a respectively adjoining bearing seat shoulder of the transmission housing.

The cone angles of the two conical sliding bearings 6, 8 are selected so as to have different sizes. The difference in the two cone angles is greater than a manufacturing-related tolerance. Since the manufacturing-related tolerance of the cone angles is ±0.01°, the cone angle of the left-hand conical sliding bearing 6 is 19.1°±0.01°, the cone angle of the right-hand conical sliding bearing 8 is 19.2°±0.01°. The minimum difference between the two sliding bearings 6, 8 is therefore (19.2°−0.01°)−(19.1°+0.01°)=0.08° and is therefore eight times greater than the manufacturing-related tolerance of 0.01°.

FIG. 2 shows a section of a transmission shaft 4 on which a helical spur gear 2 is non-rotatably and axially non-displaceably arranged, similar to the transmission shaft shown in FIG. 1. Immediately adjoining two end faces of the spur gear 2, the transmission shaft 4 has in each case a shoulder 14, formed by a reduction in radius of the transmission shaft 4.

Non-rotatably arranged on the transmission shaft 4 in a shaft step formed by an axially right-hand shoulder 14b is a first inner sliding bearing sleeve 6a. Spaced apart from first inner sliding bearing sleeve 6a by a distance ring 20, a second inner sliding bearing sleeve 8a is non-rotatably arranged on the transmission shaft 4. The tapered ends of the conically formed inner bearing sleeves 6a, 8a point toward each other. Adjoining an axially left-hand shoulder 14a, the transmission shaft is mounted in a further bearing 10 which is designed as a non-conical, cylindrical radial sliding bearing or as a rolling bearing.

Located in bearing seats, which are formed in the transmission housing 12, are outer bearing sleeves 6b, 8b, which are designed to correspond to the two inner bearing sleeves 6a, 8a arranged on the transmission shaft 4. In each case an inner 6a, 8a and a corresponding outer bearing sleeve 6b, 8b with the lubrication gap 9 formed therebetween form a sliding bearing 6, 8. The transmission shaft 4 with the spur gear arranged thereon is therefore mounted at one shaft end in two conical sliding bearings 6, 8 in an O formation and at the other shaft end in a non-conical sliding bearing or in a rolling bearing. The cone angles of the two conical sliding bearings 6, 8 are selected so as to have different sizes, as in the exemplary embodiment shown in FIG. 1.

In this way a fixed-floating bearing of the transmission shaft 4 is achieved. This has advantages in respect of the maximum thermal expansions that can occur and therefore a reduction in the variable bearing clearance at different operating temperatures over the bearing width of the fixed bearing.

Since the conical sliding bearings 6, 8 with the peaks that point toward each other in an O formation form a moment bearing, an embodiment is possible in which the further bearing 10 on the other end face of the spur gear is omitted.

FIG. 3 shows an enlarged diagram of the conical sliding bearing 8 shown in FIG. 1, which is arranged at the right-hand shaft end of the transmission shaft 4. An adjusting device 16, 18 is provided for adjusting the outer bearing sleeve 8b in the axial direction in order to set the lubrication gap 9 of the sliding bearing 8 at a defined height.

The adjusting device 16, 18 comprises an adjusting screw 18 and a support element 16 supported on the transmission housing 12, with the adjusting screw 18 being guided through the support element 16 and screwed into a threaded hole 80 which is introduced into the outer bearing sleeve 8b in the axial direction. By turning the adjusting screw 18, the outer bearing sleeve 8b can be displaced in the axial direction of the transmission shaft 4 relative to the transmission housing 12. The displacement direction, and consequently a reduction or increase in the gap height of the lubrication gap 9 of the sliding bearing 8, results according to the direction of rotation of the adjusting screw 18.

Figure 4:
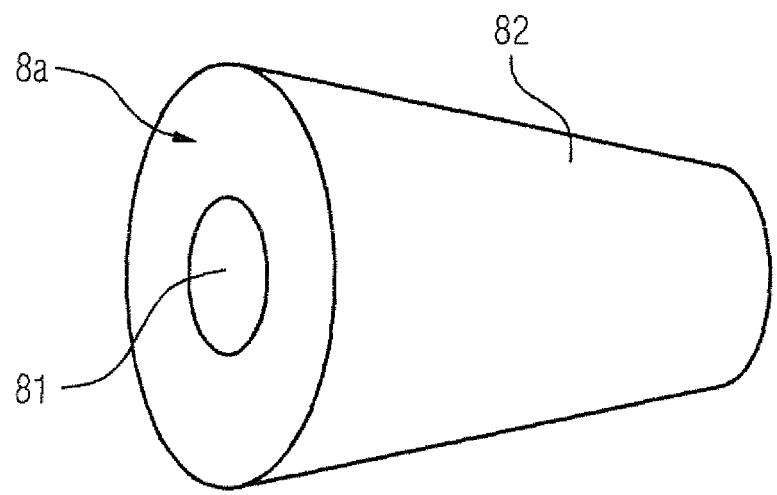
FIG. 4 shows an inner bearing sleeve.

FIG. 4 shows a view of an inner bearing sleeve 8a which has an axial hole 81 for receiving the transmission shaft and at its outer circumference a surface of a cone-shaped sliding face 82.

Figure 5:
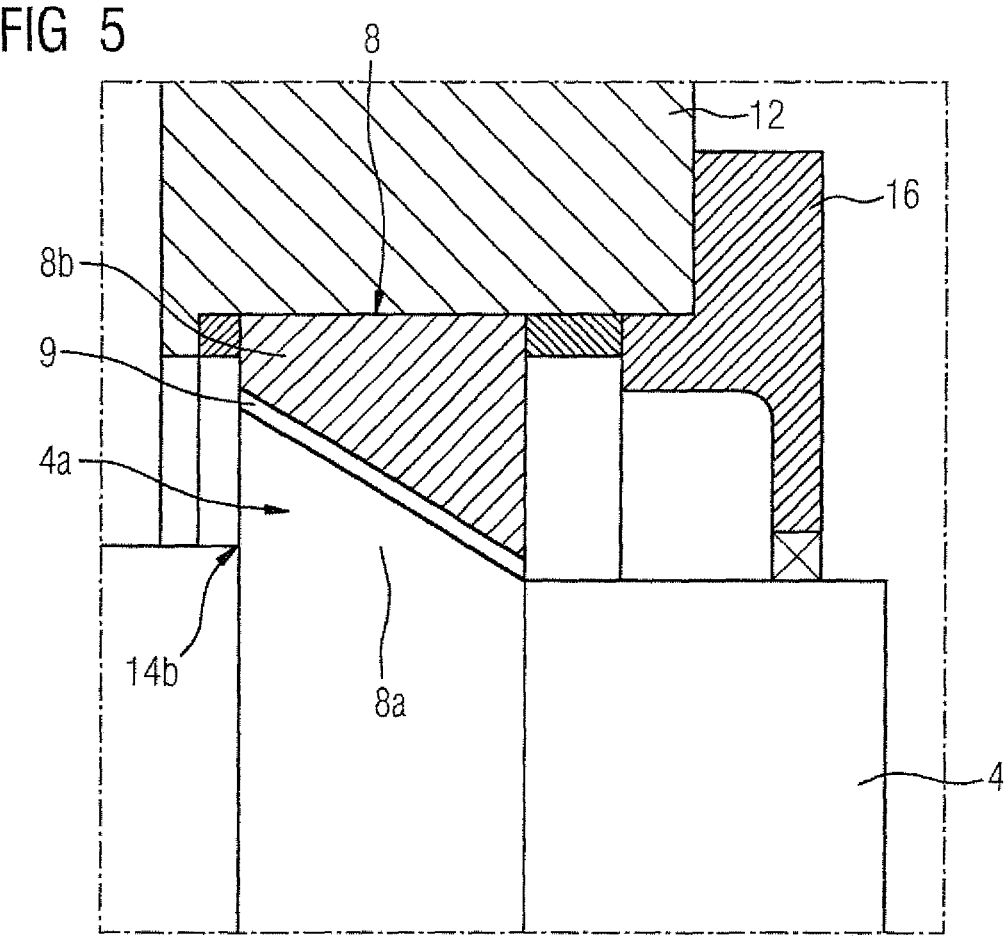
FIG. 5 shows an alternative embodiment of an inner bearing sleeve.

With the aid of the conical sliding bearing 8 shown in FIG. 1, which is arranged at the right-hand shaft end of the transmission shaft 4, FIG. 5 shows an alternative embodiment of a sliding bearing. The inner bearing sleeve 8a is not formed as a separate component which is secured to the shaft 4. Instead the inner bearing sleeve 8a is formed in one piece with the transmission shaft 4, namely formed by a conical shaft shoulder 4a of the transmission shaft 4.

Figure 6:
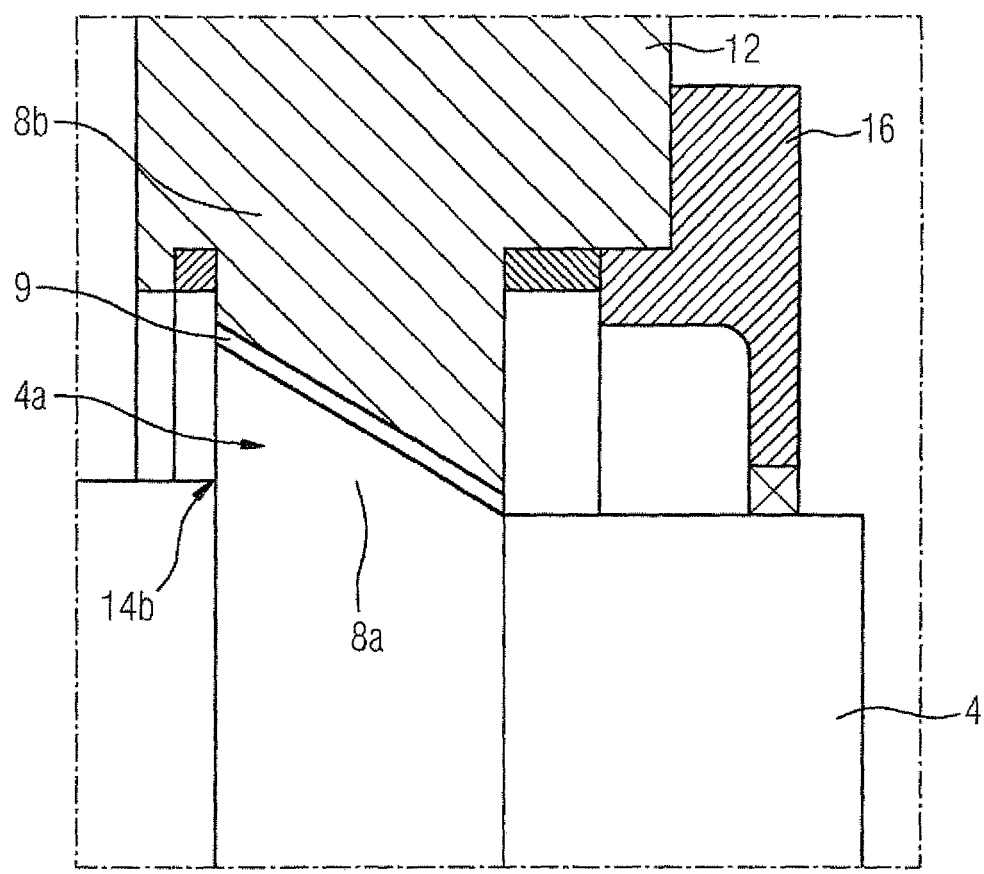
FIGS. 6 and 7 show a further embodiment of the invention.

FIG. 6 shows an embodiment in which the outer bearing sleeve 8b is a component of the housing 12, namely formed in one piece with the housing 12.

Figure 7:
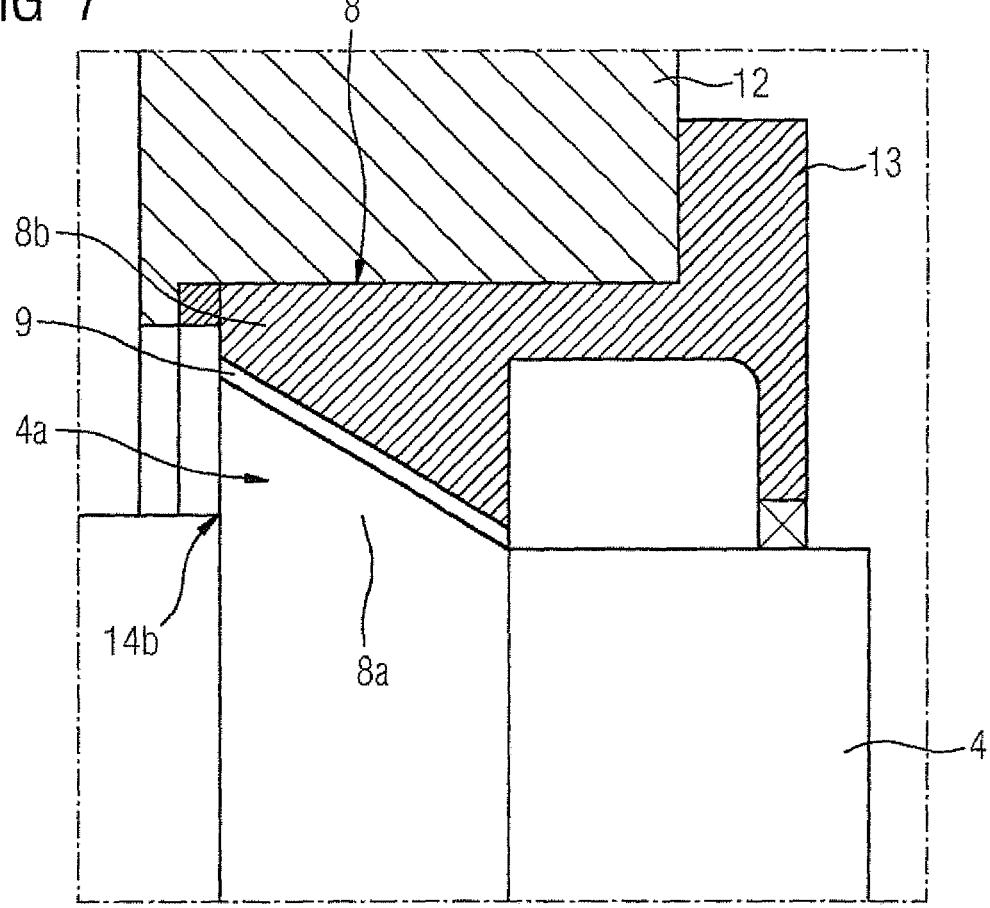

FIG. 7 shows an embodiment in which the outer bearing sleeve 8b is a component of a bearing cover 13, namely formed in one piece with the bearing cover 13.

Like FIG. 1, FIG. 8 shows an engaged sliding bearing in an X formation. In contrast to the exemplary embodiment shown in FIG. 1, with the bearing arrangement shown in FIG. 8 the cone angles of the two sliding bearings are clearly different, in other words the difference can be seen with the naked eye. The difference in the two cone angles is greater than a manufacturing-related tolerance. Since the manufacturing-related tolerance of the cone angles is ±0.01°, the cone angle of the left-hand conical sliding bearing 6 is 5°±0.01°, the cone angle of the right-hand conical sliding bearing 8 is 19.2°±0.01°.

Like FIG. 2, FIG. 9 shows a fixed-floating bearing with a double-cone sliding bearing and a cylindrical radial bearing. In contrast to the exemplary embodiment shown in FIG. 2, the cone angles of the two sliding bearings are clearly different in the bearing arrangement shown in FIG. 9, in other words the difference can be seen with the naked eye. The difference in the two cone angles is greater than a manufacturing-related tolerance. Since the manufacturing-related tolerance of the cone angles is ±0.01°, the cone angle of the left-hand conical sliding bearing 6 is 5°±0.01°, the cone angle of the right-hand conical sliding bearing 8 is 19.2°±0.01°.

The invention is claimed is:

1. A bearing arrangement of a helical spur gear which is non-rotatably arranged on a transmission shaft, said bearing arrangement comprising two conical sliding bearings configured for support of the transmission shaft, each said sliding bearing defining a cone angle with the cone angle of one of the sliding bearings being different than the cone angle of the other one of the sliding bearings, wherein at least one of the sliding bearings comprises an inner bearing sleeve and an outer bearing sleeve with a lubrication gap formed therebetween, said inner bearing sleeve being arranged on the transmission shaft and having a radially outer circumferential face configured to form a cone-shaped sliding face, said outer bearing sleeve being configured to complement a configuration of the inner bearing sleeve.

2. The bearing arrangement of claim 1, wherein the inner and outer bearing sleeves of the at least one of the conical sliding bearings define each a cone angle, with the cone angle of the inner bearing sleeve and the cone angle of the outer bearing sleeve being different.

3. The bearing arrangement of claim 1, constructed in the form of a slew bearing.

4. The bearing arrangement of claim 1, wherein the sliding bearings are arranged side by side on a same side of the spur gear and define tapered ends pointing toward each other.

5. The bearing arrangement of claim 4, wherein the sliding bearings are arranged axially spaced apart from each other.

6. The bearing arrangement of claim 1, wherein the sliding bearings are arranged on both sides of the spur gear, respectively, and define tapered ends pointing away from each other.

7. The bearing arrangement of claim 1, further comprising an adjusting device operably connected to the at least one of the sliding bearings for adjusting the outer bearing sleeve in an axial direction in order to adjust the lubrication gap in a defined height.

8. The bearing arrangement of claim 1, further comprising an adjusting device operably connected to only one of the sliding bearings for adjusting the outer bearing sleeve in an axial direction, said other one of the sliding bearings having an axially fixed position.

9. A transmission comprising
a transmission shaft;
a helical spur gear non-rotatably arranged on the transmission shaft; and
a bearing arrangement comprising two conical sliding bearings configured for support of the transmission shaft, each said sliding bearing defining a cone angle, with the cone angle of one of the sliding bearings being different than the cone angle of the other one of the sliding bearings, wherein at least one of the sliding bearings comprises an inner bearing sleeve and an outer bearing sleeve with a lubrication gap formed therebetween, said inner bearing sleeve being arranged on the transmission shaft and having a radially outer circumferential face configured to form a cone-shaped sliding face, said outer bearing sleeve being configured to complement a configuration of the inner bearing sleeve.

10. The transmission of claim 9, wherein the inner and outer bearing sleeves of the at least one of the conical sliding bearings define each a cone angle, with the cone angle of the inner bearing sleeve and the cone angle of the outer bearing sleeve being different.

11. The transmission of claim 9, wherein the bearing arrangement is constructed in the form of a slew bearing.

12. The transmission of claim 9, wherein the sliding bearings are arranged side by side on a same side of the spur gear and define tapered ends pointing toward each other.

13. The transmission of claim 12, wherein the sliding bearings are arranged axially spaced apart from each other.

14. The transmission of claim 9, wherein the sliding bearings are arranged on both sides of the spur gear, respectively, and define tapered ends pointing away from each other.

15. The transmission of claim 9, wherein the bearing arrangement comprises an adjusting device operably connected to the at least one of the sliding bearings for adjusting the outer bearing sleeve in an axial direction in order to adjust the lubrication gap in a defined height.

16. The transmission of claim 9, wherein the bearing arrangement comprises an adjusting device operably connected to only one of the sliding bearings for adjusting the outer bearing sleeve in an axial direction, said other one of the sliding bearings having an axially fixed position.

17. The transmission of claim 9, further comprising a member selected from the group consisting of a bearing cover and a housing, said outer bearing sleeve being a component of the member.

* * * * *